(12) United States Patent
Ono et al.

(10) Patent No.: US 10,569,656 B2
(45) Date of Patent: Feb. 25, 2020

(54) REGENERATIVE CONTROL DEVICE

(71) Applicant: Yazaki Corporation, Tokyo (JP)

(72) Inventors: Chihiro Ono, Shizuoka (JP); Takahiro Syouda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 257 days.

(21) Appl. No.: 15/664,957

(22) Filed: Jul. 31, 2017

(65) Prior Publication Data

US 2018/0072163 A1 Mar. 15, 2018

(30) Foreign Application Priority Data

Sep. 15, 2016 (JP) ................. 2016-180282

(51) Int. Cl.
*B60L 7/18* (2006.01)
*B60L 7/14* (2006.01)
*B60L 15/20* (2006.01)

(52) U.S. Cl.
CPC ................. *B60L 7/18* (2013.01); *B60L 7/14* (2013.01); *B60L 15/2009* (2013.01); *B60L 2220/42* (2013.01); *B60L 2240/12* (2013.01); *B60L 2240/461* (2013.01); *B60L 2240/647* (2013.01); *B60L 2250/24* (2013.01); *B60L 2260/28* (2013.01); *Y02T 10/645* (2013.01); *Y02T 10/646* (2013.01); *Y02T 10/72* (2013.01); *Y02T 10/7275* (2013.01); *Y02T 10/7291* (2013.01); *Y02T 90/16* (2013.01)

(58) Field of Classification Search
CPC .... B60L 7/18; B60L 15/2009; B60L 2220/42; B60L 2220/44; B60L 2220/46; B60L 7/26; B60L 2240/80; B60L 2240/461; B60L 7/10
See application file for complete search history.

(56) References Cited

U.S. PATENT DOCUMENTS

2012/0136547 A1* 5/2012 Miyazaki .................. B60T 1/10
701/70
2013/0030647 A1* 1/2013 Shimasaki ................ B60L 1/02
701/36

(Continued)

FOREIGN PATENT DOCUMENTS

JP 2008-219971 A 9/2008

*Primary Examiner* — Dale Moyer
(74) *Attorney, Agent, or Firm* — Kenealy Vaidya LLP

(57) ABSTRACT

A regenerative control device is provided with a host ECU configured to set a required amount of wheel regeneration that is an amount of wheel regeneration required for each wheel of a vehicle based on the required regeneration amount that is an amount of regeneration required in regenerative control that converts kinetic energy into electric energy depending on traveling conditions of a vehicle, and a regeneration controller configured to switch a wheel to be regenerative-controlled in a regeneration performance period shorter than a predicted vehicle behavior-appearance period from the start of regeneration in each wheel of the vehicle to the appearance of the behavior of the vehicle, that is, a period predicted based on the required amount of wheel regeneration and a vehicle speed, and control an actual amount of wheel regeneration for each wheel to the required amount of wheel regeneration.

5 Claims, 2 Drawing Sheets

(56) References Cited

U.S. PATENT DOCUMENTS

| | | | |
|---|---|---|---|
| 2013/0211644 A1* | 8/2013 | Yokoyama | B60L 7/18 701/22 |
| 2013/0289809 A1* | 10/2013 | Treharne | B60L 1/003 701/22 |
| 2015/0088380 A1* | 3/2015 | Gabor | B60L 7/10 701/41 |
| 2016/0325732 A1* | 11/2016 | Yang | B60L 3/108 |

* cited by examiner

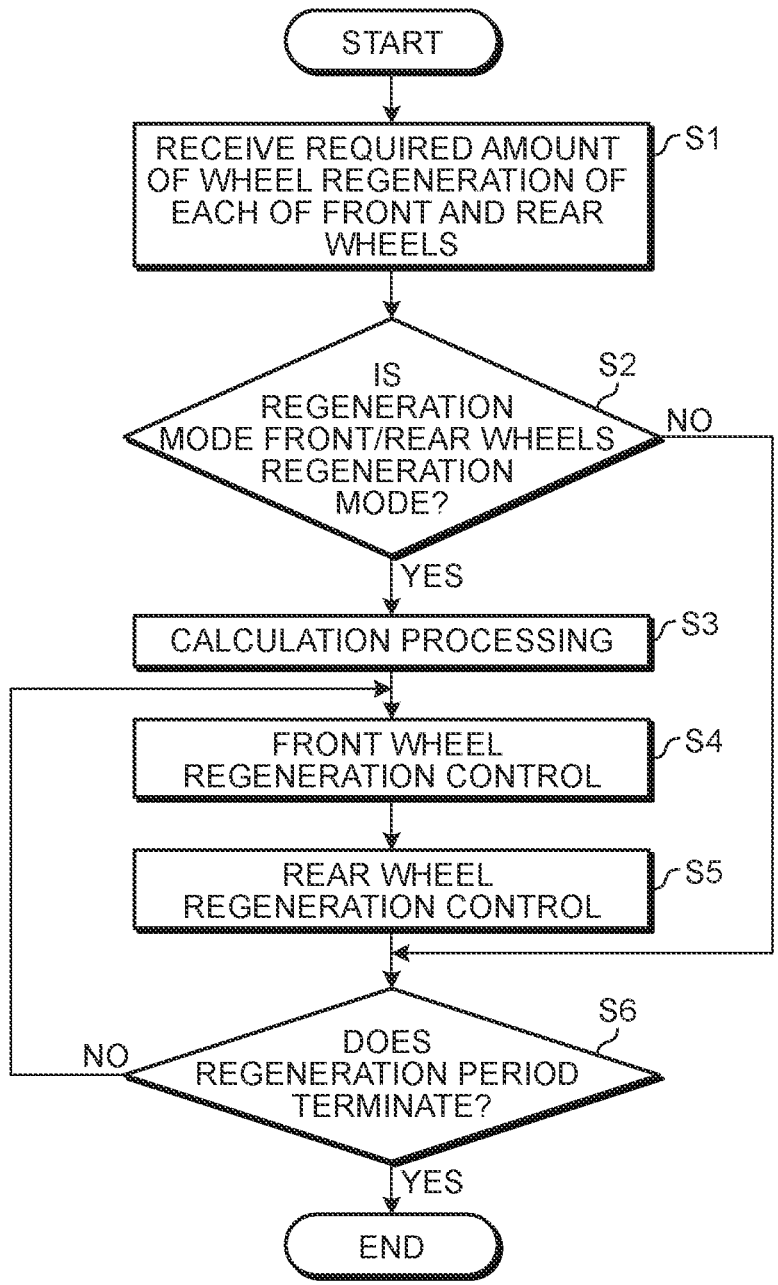

REGENERATIVE CONTROL DEVICE

CROSS-REFERENCE TO RELATED APPLICATION(S)

The present application claims priority to and incorporates by reference the entire contents of Japanese Patent Application No. 2016-180282 filed in Japan on Sep. 15, 2016.

BACKGROUND OF THE INVENTION

1. Field of the Invention

The present invention relates to a regenerative control device.

2. Description of the Related Art

Conventionally, there has been known a regenerative control device configured to perform regenerative control that converts kinetic energy of a vehicle into electric energy. The regenerative control device recovers, for example, regenerative power by regenerative braking when the vehicle decelerates (see Japanese Patent Application Laid-open No. 2008-219971, for example).

There is a case where the regenerative control device uses, for example, regenerative braking provided independently for different each wheel in the vehicle to recover regenerative power from each wheel. In this case, it is desired that the regenerative control device performs the regenerative control in a state that a position of the vehicle is maintained.

SUMMARY OF THE INVENTION

The present invention has been made under such circumstances, and it is an object of the present invention to provide a regenerative control device capable of performing regenerative control in a state that a position of a vehicle is maintained, even when the regenerative control is performed for each of different wheels.

In order to achieve the above-mentioned object, a regenerative control device according to one aspect of the present invention includes a regeneration amount setting unit configured to set a required amount of wheel regeneration as an amount of wheel regeneration required for each wheel of a vehicle based on a required regeneration amount which is an amount of regeneration required in regenerative control where kinetic energy is converted into electric energy depending on traveling conditions of the vehicle, and a regeneration controller configured to control a regenerative device arranged for each wheel and perform the regenerative control, wherein in the regenerative control, the regeneration controller switches a wheel to be regenerative-controlled with the regenerative device in a regeneration performance period shorter than a predicted vehicle behavior-appearance period from start of regeneration in each wheel of the vehicle to appearance of behavior of the vehicle, the predicted vehicle behavior-appearance period being a period predicted based on the required amount of wheel regeneration and a vehicle speed, and controls an actual amount of wheel regeneration for each wheel to the required amount of wheel regeneration.

According to another aspect of the present invention, in the regenerative control device, the regeneration controller may repeatedly switch the wheel to be regenerative-controlled in the regeneration performance period shorter than the predicted vehicle behavior-appearance period, and may control the actual amount of wheel regeneration for each wheel to the required amount of wheel regeneration.

According to still another aspect of the present invention, in the regenerative control device, the wheel to be regenerative-controlled may be a front wheel or a rear wheel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart illustrating an operation example of the regenerative control device according to the embodiment.

DETAILED DESCRIPTION OF THE PREFERRED EMBODIMENTS

Figure 1:
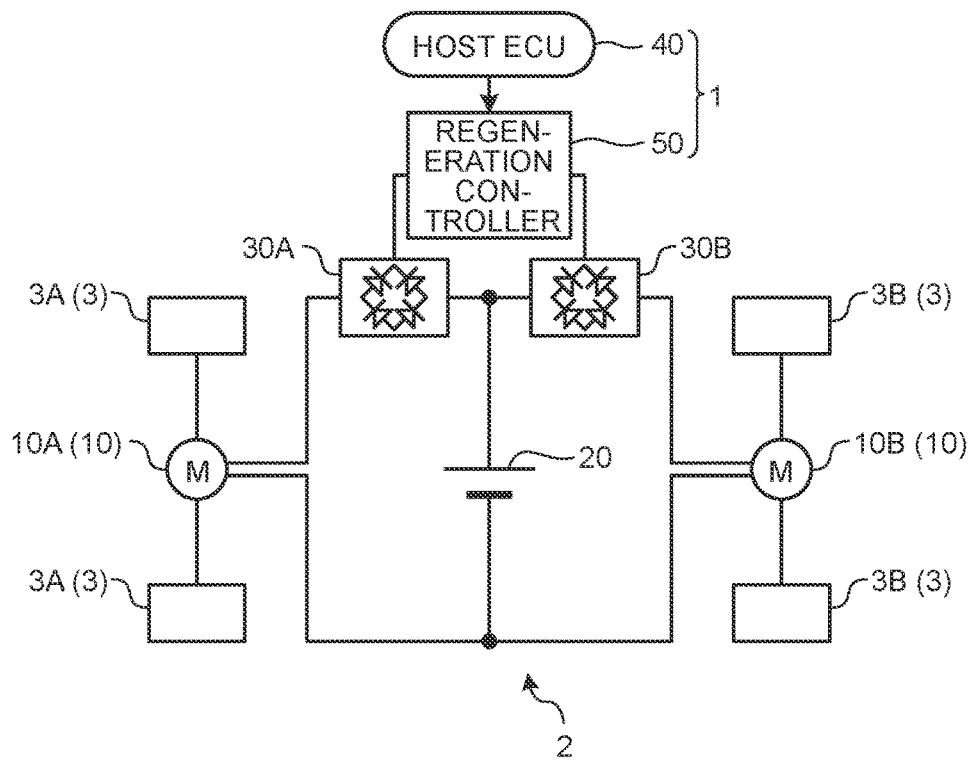
FIG. 1 is a circuit diagram illustrating a configuration example of a regenerative control device according to an embodiment.

An embodiment according to the present invention will be explained with reference to the accompanying drawings. Here, the present invention is not limited to the contents described in the following embodiment. Furthermore, constitutional features in the following embodiment include a part that is easily conceivable by those skilled in the art, or parts substantially equal to each other. Configuration examples described below can be optionally combined with each other. In addition, various abbreviations, substitutions, or modifications of the constitutions described below can be made without departing from the gist of the present invention.

Embodiment

A regenerative control device according to the embodiment is explained. A regenerative control device 1 is configured to perform regenerative control that converts kinetic energy into electric energy depending on traveling conditions of a vehicle 2. In the present embodiment, the regenerative control device 1 is mounted on the vehicle 2, such as an electric vehicle (EV), a plug-in hybrid electric vehicle (PHEV), or a hybrid electric vehicle (HEV).

The regenerative control device 1 has, for example, a function (regenerative brake) that converts kinetic energy of one or more wheels 3 into electric energy to recover the electric energy when the vehicle 2 decelerates. In the regenerative control device 1, for example, when a brake pedal (not illustrated in the drawings) is stepped, the rotational force of the wheels 3 is transmitted to a motor-generator 10 of the vehicle 2 to rotate the motor-generator 10, and the motor-generator 10 thus generates an electromotive voltage (regenerative voltage). The regenerative control device 1 charges a battery 20 of the vehicle 2 with the regenerative voltage generated by the motor-generator 10. The regenerative voltage is high when the speed of the vehicle 2 is relatively high, in other words, the kinetic energy is high, and the regenerative voltage is low when the speed of the vehicle 2 is relatively low, in other words, the kinetic energy is low. Here, the motor-generator 10 may be constituted such that a drive motor that drives the wheels 3 also has a function of a power generator, or a power generator is provided in addition to the drive motor. Hereinafter, the regenerative control device 1 is explained in detail.

The regenerative control device 1 is, as illustrated in FIG. 1, provided with a front-wheel motor-generator 10A (hereinafter, referred to as "front-wheel MG 10A"), which serves as a regenerative device; a rear-wheel motor-generator 10B (hereinafter, referred to as "rear-wheel MG 10B"), which serves as a regenerative device; the battery 20; a front-wheel rectification charger 30A; a rear-wheel rectification charger 30B; a host electronic control unit (ECU) 40 as a regeneration amount setting unit; and a regeneration controller 50.

The front-wheel MG 10A performs power running of the vehicle 2, and also generates regenerative power. The front-wheel MG 10A is one of electric apparatuses mounted on the vehicle 2, and arranged in a front part of the vehicle 2. The front-wheel MG 10A has a rotor shaft that is connected with two front wheels 3A of the vehicle 2 by way of connecting mechanisms, such as drive shafts. The front-wheel MG 10A has a motor function that converts electric power supplied thereto into mechanical power, and a function as a power generation unit that converts the mechanical power into the electric power. The front-wheel MG 10A has, for example, a function as an alternator that generates electric power by mechanical power transmitted from the front wheel(s) 3A or an engine (not illustrated in the drawings), and a function as a traveling power source of the vehicle 2 that is operated by consuming electric power supplied from the battery 20, as described below. The front-wheel MG 10A consumes electric power supplied thereto to rotates the front wheel(s) 3A of the vehicle 2, and also generates electric power by a rotational force received from the front wheel(s) 3A.

The rear-wheel MG 10B executes power running of the vehicle 2, and also generates regenerative power. The rear-wheel MG 10B is one of the electric apparatuses mounted on the vehicle 2, and arranged in a rear part of the vehicle 2. The rear-wheel MG 10B has a rotor shaft connected with two rear wheels 3B of the vehicle 2 by way of connecting mechanisms, such as drive shafts. The rear-wheel MG 10B has a motor function that converts electric power supplied thereto into mechanical power, and a function as a power generation unit that converts the mechanical power into the electric power. The rear-wheel MG 10B has, for example, a function as an alternator that generates electric power by mechanical power transmitted from the rear wheel(s) 3B or an engine, and a function as a traveling power source of the vehicle 2 that is operated by consuming electric power supplied from the battery 20 described below. The rear-wheel MG 10B consumes electric power supplied thereto to rotates the rear wheel(s) 3B of the vehicle 2, and also generates electric power by a rotational force received from the rear wheel(s) 3B.

The Battery 20 stores electric power. The battery 20 is a power source of the vehicle 2, and is also a DC power supply capable of being charged and discharged. The battery 20 is connected to the front-wheel MG 10A via the front-wheel rectification charger 30A, supplies electric power to the front-wheel MG 10A, and also charges therein the regenerative power from the front-wheel MG 10A. The battery 20 is connected to the rear-wheel MG 10B via the rear-wheel rectification charger 30B, supplies electric power to the rear-wheel MG 10B, and also charges therein the regenerative power from the rear-wheel MG 10B. An allowable amount of acceptance of the battery 20 is determined by a state of charge (SOC), a state of health (SOH), a temperature, an internal resistance, a cell voltage, and the like. The battery 20 is charged so that the amount of charge does not exceed the allowable amount of acceptance. The battery 20 is charged until the voltage of the battery 20 increases up to a charge final voltage that is a voltage indicating the completion of charge.

The front-wheel rectification charger 30A is an AC-DC converter, which converts an alternating current voltage (AC power) into a direct current voltage (DC power). The front-wheel rectification charger 30A is connected to the front-wheel MG 10A and the battery 20, performs full wave rectification of an alternating current voltage (regenerative voltage) output from the front-wheel MG 10A to convert the alternating current voltage into a direct current voltage, and outputs the direct current voltage to the battery 20. The front-wheel rectification charger 30A is connected to the regeneration controller 50, and controlled by the regeneration controller 50 to be turned on and off. The front-wheel rectification charger 30A converts, when it is an ON state, an alternating current voltage output from the front-wheel MG 10A into a direct current voltage to output the direct current voltage to the battery 20. The front-wheel rectification charger 30A does not convert, when it is an OFF state, the alternating current voltage output from the front-wheel MG 10A into the direct current voltage.

The rear-wheel rectification charger 30B is an AC-DC converter, which converts an alternating current voltage (AC power) into a direct current voltage (DC power). The rear-wheel rectification charger 30B is connected to the rear-wheel MG 10B and the battery 20, performs full wave rectification of an alternating current voltage output from the rear-wheel MG 10B to convert the alternating current voltage into a direct current voltage, and outputs the direct current voltage to the battery 20. The rear-wheel rectification charger 30B is connected to the regeneration controller 50, and controlled by the regeneration controller 50 to be turned on and off. The rear-wheel rectification charger 30B converts, when it is an ON state, an alternating current voltage output from the rear-wheel MG 10B into a direct current voltage to output the direct current voltage to the battery 20. The rear-wheel rectification charger 30B does not convert, when it is an OFF state, the alternating current voltage output from the rear-wheel MG 10B into the direct current voltage.

The host ECU 40 controls the vehicle 2 as a whole and, for example, controls a drive system and a braking system that correspond to the engine and the brake of the vehicle 2, respectively. The host ECU 40 includes an electronic circuit mainly composed of a known microcomputer including a CPU, a ROM and a RAM that constitute a storage unit, and an interface. The host ECU 40 determines, for example, a required regeneration amount that is the amount of regeneration required in regenerative control, based on a stepping amount of a brake pedal. The required regeneration amount is the amount of regeneration required for the vehicle 2 as a whole. The required regeneration amount is typically the total amount of regeneration required for all wheels 3 of the vehicle 2. The required regeneration amount is determined every each timing at which the regenerative control is required. For example, the required regeneration amount is determined at the timing, when a stepping amount of the brake pedal is detected, based on the stepping amount of the brake pedal. Furthermore, the host ECU 40 sets a required amount of wheel regeneration that is the amount of wheel regeneration required for each wheel 3 of the vehicle 2, based on the required regeneration amount. The required amount of wheel regeneration is the amount of wheel regeneration required individually for each wheel 3. In the present embodiment, the required amount of wheel regeneration is set individually with respect to the front wheel 3A and the rear wheel 3B. The distribution of the required amount of wheel regeneration to each of the front wheel 3A and the rear wheel 3B is typically determined based on map data, formulae, or the like depending on a position of the vehicle 2.

The regeneration controller 50 performs regenerative control based on the required amount of wheel regeneration. The regeneration controller 50 determines a traveling mode of the vehicle 2 from a command value based on the required amount of wheel regeneration. The traveling mode is determined as "regeneration" when the command value based on the required amount of wheel regeneration is positive, and determined as "power running" when the command value based on the required amount of wheel regeneration is negative or zero. For example, the traveling mode is determined as a front/rear wheels regenerative mode in which the front wheel(s) 3A and the rear wheel(s) 3B are used for regeneration, when the command value of the required amount of wheel regeneration with respect to the front wheel 3A is positive, and the command value of the required amount of wheel regeneration with respect to the rear wheel 3B is positive. The traveling mode is determined as a front-wheel regenerative mode in which the front wheel 3A is used for regeneration and the rear wheel 3B is used for power running, when the command value of the required amount of wheel regeneration with respect to the front wheel 3A is positive and the command value of the required amount of wheel regeneration with respect to the rear wheel 3B is negative or zero. The traveling mode is determined as a rear-wheel regenerative mode in which the front wheel 3A is used for power running and the rear wheel 3B is used for regeneration, when the command value of the required amount of wheel regeneration with respect to the front wheel 3A is negative or zero and the command value of the required amount of wheel regeneration with respect to the rear wheel 3B is positive. Furthermore, the traveling mode is determined as a power running mode in which the front wheel 3A and the rear wheel 3B are used for power running, when the command value of the required amount of wheel regeneration with respect to the front wheel 3A is negative or zero and the command value of the required amount of wheel regeneration with respect to the rear wheel 3B is negative or zero.

Figure 2:
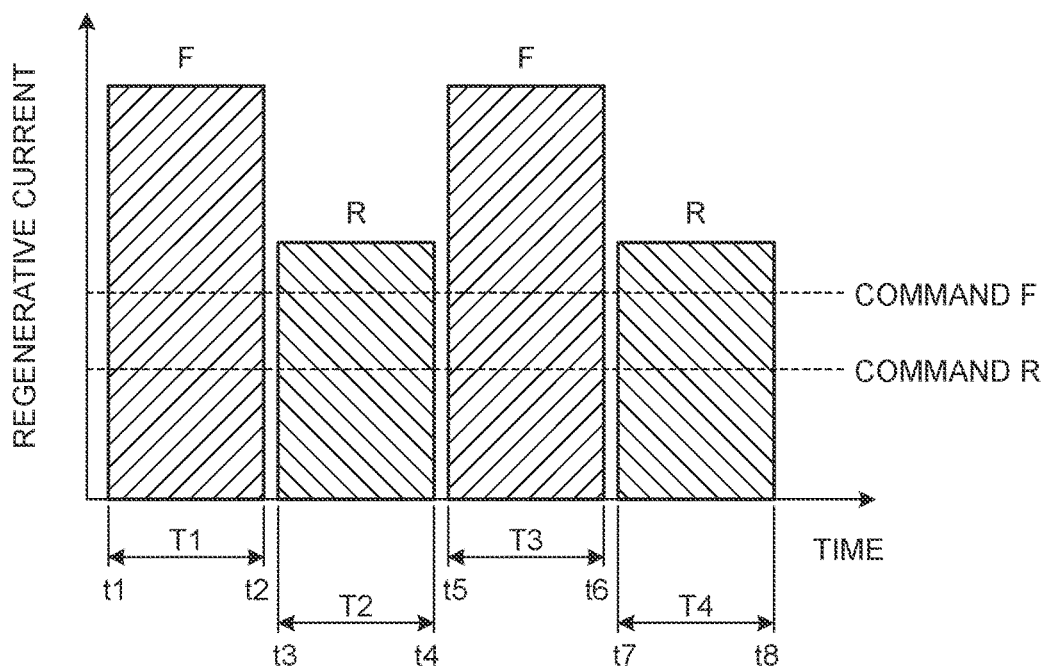
FIG. 2 is a chart diagram illustrating an example of regenerative control according to the embodiment.

The regeneration controller 50 includes an electronic circuit mainly composed of a known microcomputer including a CPU, a ROM and a RAM that constitute a storage unit, and an interface. The regeneration controller 50 controls the front-wheel rectification charger 30A and the rear-wheel rectification charger 30B based on various kinds of traveling modes. Furthermore, the regeneration controller 50 switches the wheel(s) 3 to be regenerative-controlled, based on the various kinds of traveling modes. For example, in the front-wheel regenerative mode, the regeneration controller 50 sets the front-wheel rectification charger 30A so that the front-wheel rectification charger 30A assumes an ON state, sets the rear-wheel rectification charger 30B so that the rear-wheel rectification charger 30B assumes an OFF state, and sets the wheel(s) 3 to be regenerative-controlled as the front wheel 3A. The regeneration controller 50 performs regeneration with the use of the front-wheel MG 10A until a regeneration period based on the required amount of wheel regeneration terminates. The regeneration period is a period until the required amount of wheel regeneration is satisfied in each wheel 3. The regeneration period is a total period of regeneration performance periods described below. The regeneration controller 50 determines the regeneration period and a regenerative current based on the required amount of wheel regeneration. For example, when the required amount of wheel regeneration of the front wheel 3A is larger than the required amount of wheel regeneration of the rear wheel 3B, the regeneration controller 50 is, as illustrated in FIG. 2, operated so that the regenerative current of the front wheel 3A is larger than the regenerative current of the rear wheel 3B. To consider a case where the regeneration controller 50 is, for example, operated so that the regenerative current of the front wheel 3A is equal to the regenerative current of the rear wheel 3B, the regeneration period relatively increases as the required amount of wheel regeneration becomes relatively large. In the rear-wheel regenerative mode, the regeneration controller 50 sets the rear-wheel rectification charger 30B so that the rear-wheel rectification charger 30B assumes an ON state, sets the front-wheel rectification charger 30A so that the front-wheel rectification charger 30A assumes an OFF state, and also sets the wheel 3(s) to be regenerative-controlled as the rear wheel 3B. The regeneration controller 50 performs regeneration with the use of the rear-wheel MG 10B until the regeneration period based on the required amount of wheel regeneration terminates. In the power running mode, the regeneration controller 50 sets the front-wheel rectification charger 30A so that the front-wheel rectification charger 30A assumes an OFF state, sets the rear-wheel rectification charger 30B so that the rear-wheel rectification charger 30B assumes an OFF state, and also sets the front wheel 3A and the rear wheel 3B so as not to be regenerative-controlled. Here, in FIG. 2, a command value F indicates that the command value for the front wheel 3A is positive, and a command value R indicates that the command value for the rear wheel 3B is positive.

Furthermore, in the front/rear wheels regenerative mode, the regeneration controller 50 first sets the front-wheel rectification charger 30A so that the front-wheel rectification charger 30A is an ON state, sets the rear-wheel rectification charger 30B so that the rear-wheel rectification charger 30B is an OFF state, and also sets the wheel 3(s) to be regenerative-controlled as the front wheel 3A. Next, the regeneration controller 50 sets the front-wheel rectification charger 30A so that the front-wheel rectification charger 30A is an OFF state, sets the rear-wheel rectification charger 30B so that the rear-wheel rectification charger 30B is an ON state, and also switches the wheel(s) 3 to be regenerative-controlled from the front wheel 3A to the rear wheel 3B. The regeneration controller 50 alternately repeats the regeneration with the use of the front-wheel MG 10A, and the regeneration with the use of the rear-wheel MG 10B until the regeneration period based on the required amount of wheel regeneration terminates. In the front/rear wheels regenerative mode, the regeneration controller 50 alternately switches between the front wheel 3A and the rear wheel 3B as the wheels 3 to be regenerative-controlled until the regeneration period terminates. In this case, the regeneration controller 50 switches the wheel 3(s) to be regenerative-controlled in a regeneration performance period shorter than a predicted vehicle behavior-appearance period, and controls the actual amount of wheel regeneration for each wheel 3 to the required amount of wheel regeneration. The predicted vehicle behavior-appearance period is a period predicted based on the required amount of wheel regeneration and a vehicle speed; that is, a period from the start of regeneration in each wheel 3 of the vehicle 2 to the appearance of behavior of the vehicle 2. The predicted vehicle behavior-appearance period is, for example, a period predetermined by experiments, and is stored in the ROM as map data or formulae. For example, the predicted vehicle behavior-appearance period is a period not in excess of the time constant of vehicle inertia, and is obtained through experiments performed by changing optionally conditions, such as the amount of wheel regeneration, vehicle speed, and road surface states (dry, snowfall, or the like). The predicted vehicle behavior-appearance period may be determined based on a slip ratio obtained by dividing the difference between a vehicle speed and a rotational speed of the wheel(s) 3 by the vehicle speed. Typically, the predicted vehicle behavior-appearance period becomes relatively short with a relative increase in the amount of wheel regeneration, and becomes relatively short with a relative increase in the vehicle speed. In the case of the regenerative control with the use of the front wheel 3A, as illustrated in FIG. 2, the regeneration performance period is, for example, a period T1 from a starting point of time t1 at which the regenerative control of the front wheel 3A is started to a termination point of time t2 at which the regenerative control of the front wheel 3A is terminated. In the case of the regenerative control with the use of the rear wheel 3B, the regeneration performance period is a period T2 from a starting point of time t3 at which the regenerative control of the rear wheel 3B is started to a termination point of time t4 at which the regenerative control of the rear wheel 3B is terminated. The regeneration performance periods, such as a period T3 from a starting point of time t5 of the front wheel 3A to a termination point of time t6 of the front wheel 3A, and a period T4 from a starting point of time t7 of the rear wheel 3B to a termination point of time t8 of the rear wheel 3B, are repeated while switching between the front wheel 3A and the rear wheel 3B. The above-described regeneration period is a period obtained by adding the regeneration performance periods to each other for each wheel 3 in one regeneration request. The actual amount of wheel regeneration is the amount of wheel regeneration when regenerated with the use of the front-wheel MG 10A or the rear-wheel MG 10B, and is calculated based on the electric current value of the regenerative current, or the like.

Next, an operation example of the regenerative control device 1 is explained with reference to FIG. 3. The regeneration controller 50 of the regenerative control device 1 first receives the required amount of wheel regeneration of each of the front wheel 3A and the rear wheel 3B from the host ECU 40 (S1). Next, the regeneration controller 50 determines whether the front/rear wheels are in the regeneration mode (S2). For example, the regeneration controller 50 determines the traveling mode of the vehicle 2 from a command value based on the required amount of wheel regeneration. For example, the regeneration controller 50 determines that the traveling mode is the front/rear wheels regenerative mode, when the command value of the required amount of wheel regeneration with respect to the front wheel 3A is positive and the command value of the required amount of wheel regeneration with respect to the rear wheel 3B is positive. When the traveling mode is the front/rear wheels regenerative mode (Yes at S2), the regeneration controller 50 performs calculation processing (S3). For example, the regeneration controller 50 calculates the regeneration period, the regeneration performance period, and the predicted vehicle behavior-appearance period. For example, the regeneration controller 50 calculates the predicted vehicle behavior-appearance period based on map data or formulae. The regeneration controller 50 calculates the regeneration performance period from the starting point of time at which the regenerative control is started to the termination point of time at which the regenerative control is terminated. Furthermore, the regeneration controller 50 calculates the regeneration period by adding the regeneration performance periods to each other. The regeneration period is a period until the required amount of wheel regeneration is satisfied in each wheel 3.

Next, the regeneration controller 50 performs front-wheel regenerative control (S4). For example, the regeneration controller 50 first sets the front-wheel rectification charger 30A so that the front-wheel rectification charger 30A is an ON state, sets the rear-wheel rectification charger 30B so that the rear-wheel rectification charger 30B is an OFF state, also sets the wheels 3 to be regenerative-controlled to the front wheel 3A, and switches the function of the front-wheel MG 10A from the motor function to the function as the power generation unit. The regeneration controller 50 controls the front-wheel rectification charger 30A to convert the regenerative power generated by the front-wheel MG 10A into DC power, and outputs the DC power to the battery 20. Furthermore, the regeneration controller 50 switches the wheels 3 to be regenerative-controlled from the front wheel 3A to the rear wheel 3B in a regeneration performance period shorter than the predicted vehicle behavior-appearance period, and perform rear-wheel regenerative control (S5). For example, the regeneration controller 50 sets the front-wheel rectification charger 30A so that the front-wheel rectification charger 30A assumes an OFF state, and sets the rear-wheel rectification charger 30B so that the rear-wheel rectification charger 30B assumes an ON state. The regeneration controller 50 switches the function of the front-wheel MG 10A from the function as the power generation unit to the motor function, and also switches the rear-wheel MG 10B from the motor function to the function as the power generation unit. The regeneration controller 50 controls the rear-wheel rectification charger 30B to convert the regenerative power generated by the rear-wheel MG 10B into DC power, and outputs the DC power to the battery 20. The regeneration controller 50 determines whether the regeneration period terminates (S6). When the regeneration controller 50 terminates the regeneration period (Yes at S6), the processing is terminated. When the regeneration period of the regeneration controller 50 does not terminate (No at S6), the processing returns to S4. In this manner, the regeneration controller 50 alternately and repeatedly switches the wheel 3(s) to be regenerative-controlled between the front wheel 3A and the rear wheel 3B in the regeneration performance period shorter than the predicted vehicle behavior-appearance period, until the regeneration period terminates. Here, at S2, when the traveling mode is not the front/rear wheels regenerative mode (No at S2), the processing advances to S6.

As described heretofore, the regenerative control device 1 according to the embodiment is provided with the regeneration controller 50 that switches the wheel(s) 3 to be regenerative-controlled in a period predicted based on the required amount of wheel regeneration and the vehicle speed; that is, a regeneration performance period shorter than the predicted vehicle behavior-appearance period from the start of regeneration in each wheel 3 of the vehicle 2 to the appearance of the behavior of the vehicle 2, thus controlling the actual amount of wheel regeneration for each wheel 3 to the required amount of wheel regeneration. With this configuration, it is unnecessary for the regenerative control device 1 to recover simultaneously the regenerative power generated with the use of the front wheel 3A and the regenerative power generated with the use of the rear wheel 3B, and equally adjust voltages when charging the regenerative power to the battery 20. Accordingly, the regenerative control device 1 is capable of easily performing the regenerative control as compared with the case of simultaneously recovering the regenerative power generated with the use of the front wheel 3A and the regenerative power generated with the use of the rear wheel 3B. Furthermore, the regenerative control device 1 switches the wheels 3 to be regenerative-controlled before the appearance of the behavior of the vehicle 2 and hence, even when performing regeneration for each of the different wheels 3, it is possible to perform the regenerative control in a state that the position of the vehicle 2 is maintained. In addition, the regenerative control device 1 is capable of performing mechanical braking at a timing of switching the wheel(s) 3 to be regenerative-controlled, and performing the mechanical braking concurrently with regenerative braking.

Furthermore, the regenerative control device 1 repeatedly performs the processing that switches the wheels 3 to be regenerative-controlled in the regeneration performance period shorter than the predicted vehicle behavior-appearance period, and controls the actual amount of wheel regeneration for each wheel 3 to the required amount of wheel regeneration. With this configuration, the regenerative control device 1 is capable of executing regenerative control while maintaining the position of the vehicle 2.

Furthermore, the regenerative control device 1 uses the front wheel 3A and the rear wheel 3B as the wheels 3 to be regenerative-controlled. With this configuration, even when separately performing the regenerative control of the front wheel 3A and the rear wheel 3B, the regenerative control device 1 switches between the front wheel 3A and the rear wheel 3B that are to be regenerative-controlled before the appearance of the behavior of the vehicle 2 and hence, it is possible to perform the regenerative control in a state that the position of the vehicle 2 is maintained.

Modification

Next, a modification of the present embodiment is explained. The host ECU 40 and the regeneration controller 50 may be configured to form a separate configuration, or an integral configuration.

Although the explanation is made with respect to an example in which the required amount of wheel regeneration is the amount of regeneration required for each of the front wheel 3A and the rear wheel 3B, the present invention is not limited to the example. The required amount of wheel regeneration may be, for example, the amount of wheel regeneration required for each wheel 3 of the vehicle 2. In this case, the required amount of wheel regeneration is, for example, the amount of wheel regeneration required for each of the four wheels in the case of a four-wheeled vehicle, and the amount of wheel regeneration required for each of the three wheels in the case of a three-wheeled vehicle. Furthermore, the required amount of wheel regeneration may be the amount of wheel regeneration required for each of the right and left wheels.

The regenerative control device according to the present embodiment switches the wheels to be regenerative-controlled in the regeneration performance period shorter than the predicted vehicle behavior-appearance period, and controls the actual amount of regeneration for each wheel to the required amount of wheel regeneration and hence, it is possible to perform the regenerative control in a state that the position of the vehicle is maintained even when the regenerative control is performed for each of the different wheels.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A regenerative control device comprising:
a host controller configured to set a required amount of wheel regeneration as an amount of wheel regeneration required for each wheel of a vehicle based on a required regeneration amount which is an amount of regeneration required in regenerative control where kinetic energy is converted into electric energy depending on traveling conditions of the vehicle; and
a regeneration controller configured to control a regenerative device arranged for each wheel, and perform the regenerative control, wherein
in the regenerative control, the regeneration controller switches a wheel to be regenerative-controlled with the regenerative device in a regeneration performance period shorter than a predicted vehicle behavior-appearance period from start of regeneration in each wheel of the vehicle to appearance of behavior of the vehicle, the predicted vehicle behavior-appearance period being a period predicted based on the required amount of wheel regeneration and a vehicle speed, and controls an actual amount of wheel regeneration for each wheel to the required amount of wheel regeneration.

2. The regenerative control device according to claim 1, wherein
the regeneration controller repeatedly switches the wheel to be regenerative-controlled in the regeneration performance period shorter than the predicted vehicle behavior-appearance period, and controls the actual amount of wheel regeneration for each wheel to the required amount of wheel regeneration.

3. The regenerative control device according to claim 1, wherein
the wheel to be regenerative-controlled is a front wheel or a rear wheel.

4. The regenerative control device according to claim 2, wherein
the wheel to be regenerative-controlled is a front wheel or a rear wheel.

5. A regenerative control device for a vehicle including a front wheel, a front motor connected to the front wheel, a rear wheel, a rear motor connected to the rear wheel, a battery electrically connected to the front motor and the rear motor, and a brake pedal, the regenerative control device comprising:
a regeneration controller in electrical communication with the front motor and the rear motor; and
a host controller in electrical communication with the regeneration controller and configured to,
determine a required amount of total regeneration based on a stepping input to the brake pedal, where the required amount of total regeneration corresponds to kinetic energy of the vehicle that is converted into electric energy, and
determine a required amount of wheel regeneration for each of the front wheel and the rear wheel based on the required amount of total regeneration,
wherein the regeneration controller is configured to,
receive the required amount of wheel regeneration for each of the front wheel and the rear wheel from the host controller, calculate a vehicle behavior-appearance period based on a vehicle speed and the required amount of wheel regeneration for each of the front wheel and the rear wheel, perform regeneration control on one of the front motor and the rear motor by switching the one of the front motor and the rear motor from a motor function to a power function such that electric energy generated by the one of the front motor and the rear motor is supplied to the battery, switch a different one of the front motor and the rear motor and perform the regeneration control on the different one of the front motor and the rear motor when a regeneration performance period terminates, where the regeneration performance period is shorter than the vehicle behavior-appearance period, and terminate regeneration control when the vehicle behavior-appearance period terminates.

* * * * *